United States Patent [19]

Straub et al.

[11] Patent Number: 4,987,940
[45] Date of Patent: Jan. 29, 1991

[54] CROSS WEB LAYER APPLICATION DEVICE

[75] Inventors: Melvin J. Straub, Plymouth; Edwin Kalash, Independence; Douglas A. Swenson, Maplewood, all of Minn.

[73] Assignee: Minnesota Mining and Manufacturing Company, Saint Paul, Minn.

[21] Appl. No.: 234,310

[22] Filed: Aug. 19, 1988

[51] Int. Cl.5 .............................................. B32B 31/10
[52] U.S. Cl. .................................... 156/164; 156/496; 156/519; 156/552
[58] Field of Search ............... 156/164, 494, 496, 504, 156/505, 519, 552

[56] References Cited

U.S. PATENT DOCUMENTS

| 3,711,354 | 1/1973 | Burger | 156/269 |
| 3,728,191 | 4/1973 | Wierzba et al. | 156/265 |
| 4,284,454 | 8/1981 | Joa | 156/163 |
| 4,285,747 | 8/1981 | Piega | 156/229 X |
| 4,443,291 | 4/1984 | Reed | 156/505 X |
| 4,608,115 | 8/1986 | Schroth et al. | 156/519 |
| 4,642,151 | 2/1987 | Coenen | 156/229 X |
| 4,726,874 | 2/1988 | VanVliet | 156/495 |

Primary Examiner—David A. Simmons
Assistant Examiner—James J. Engel, Jr.
Attorney, Agent, or Firm—Donald M. Sell; Walter N. Kirn; William L. Huebsch

[57] ABSTRACT

A device for applying spaced layers generally transversely across an elongate web which defines a through path for the web including parallel inlet and outlet path portions spaced sideways from each other and a transverse path portion between adjacent terminal and beginning ends of the inlet and outlet path portions. The web is moved lengthwise at a predetermined speed in a first direction along the inlet and outlet path portions, the device periodically moves the portion of the web along the transverse path portion generally edgewise in a direction parallel to the first direction and at about the predetermined speed to essentially stop longitudinal movement of the portion of the web along the transverse path portion; and the device applies a layer of material such as tape generally transversely across the portion of the web along the transverse path portion as it moves tangentially by the periphery of a rotating applicator drum.

23 Claims, 2 Drawing Sheets

CROSS WEB LAYER APPLICATION DEVICE

TECHNICAL FIELD

The present invention relates to devices for applying layers of material in spaced relationship generally transversely across an elongate web as the web continuously moves along a path through the device, and in one aspect to such devices in which the layers of material applied are lengths of tape.

BACKGROUND

Known devices for applying layers of material in spaced relationship generally transversely across an elongate web (e.g., see U.S. Pat. Nos. 3,711,354; 3,728,191; 4,284,454; 4,608,115, and 4,726,874, ) have been quite complex, and in some cases have limited the speed at which the web can be moved through the device.

DISCLOSURE OF THE INVENTION

The present invention provides an application device that can apply layers of material generally transversely across and in spaced relationship along an elongate web continuously moved through the device, which device is relatively simple compared to some prior art devices for that purpose.

The application device according to the present invention comprises means for defining a through path for the web including an inlet path portion terminating at a terminal end along which the edges of the web define parallel planes normal to the surfaces of the web, an outlet path portion that begins at a beginning end adjacent the terminal end along which the edges of the web define parallel planes normal to the surfaces of the web and parallel to and spaced from the planes defined by the edges of the web along the inlet path portion, and a transverse path portion between the terminal and beginning ends of the inlet and outlet path portions that is at an angle (e.g., a right angle) with respect to the inlet and outlet path portions. Means are provided for periodically moving a portion of the web along the transverse path portion generally edgewise in a direction parallel to the planes defined by the edges of the web while simultaneously changing the individual lengths of the inlet and outlet path portions but keeping their combined lengths the same, which movement is between a first position at which the inlet path portion has its minimum length and a second position at which the inlet path portion has its maximum length, together with means on the frame for applying a layer of material generally transversely across a portion of the web along the transverse path portion during movement of the portion of the web along the transverse path portion generally edgewise from the first position to the second position. When the web is continuously moved lengthwise at a predetermined speed in a first direction along the inlet and outlet path portions and the web portion along the transverse path portion is moved edgewise from the first position to the second position in the first direction at that same predetermined speed, the longitudinal movement of the portion of the web along the transverse path portion is essentially stopped (i.e., the length of the inlet path portion is being lengthened and the length of the outlet path portion is being shortened at the same rate of speed that the web is being moved along those path portions), and the layer of material can be applied transversely across that portion of the web along the transverse path portion (which is now moving edgewise at that predetermined speed but not lengthwise) by means such as the tangent periphery of a rotating applicator wheel moving at that same predetermined speed and in the same direction that the surface of the web portion along the transverse path portion is moving.

Preferably the means for defining the terminal and beginning ends of the inlet and outlet path portions and the transverse web path portion comprises first and second generally parallel elongate guide members in the form of light weight air bars (i.e., each guide member includes means for directing a layer of air under greater than atmospheric pressure between its periphery and the adjacent surface of the web to space the portion of the web extending around the periphery of the guide bar from its surface), which guide members are disposed at acute angles (e.g., 45 degrees) with respect to the edge portions of the web along the inlet and outlet path portions, with the first guide member defining the terminal end for the inlet outlet path portion, the second guide member defining the beginning end for the outlet path portion, and the web extending about 180 degrees around the periphery of each of the guide members and extending between the guide members to define the transverse web path portion; and the means for periodically moving a portion of the web along the transverse path portion generally edgewise between first and second positions comprises means for reciprocating the guide members along a path parallel to the planes defined by the edges of the web portions along the inlet and outlet path portions. The use of light weight air bars for the guide members both greatly reduces friction between the guide members and the web and thereby facilitates the rapid acceleration, deceleration and high rate of movement of the web round the guide members that occurs at times during reciprocation of the guide members, and provides guide members with low mass so that they can be reciprocated more rapidly.

In the embodiment of the device described herein the means for periodically moving a portion of the web along the transverse path portion generally edgewise between the first and second positions and the applicator wheel are both driven in synchronism by a drive system from other web handling mechanisms external to the application device and are adapted to be driven in synchronism by that drive system to apply layers of material in a repeat pattern along predetermined lengths of the web 11 (e.g., every 17 ½ inches along the web) when the web is moving at one speed ratio with respect to the driving speed of the drive system (e.g., a web speed of about 730 feet per minute when the driving speed of the drive system is at a normal operating speed near its top driving speed). The drive system from the other web handling mechanisms is adjustable to allow the speed ratio of the web with respect to the driving speed of the drive system to either be increased or decreased slightly (e.g., to a web speed of 812 ½ feet per minute or 604 feet per minute when the driving speed of the drive system is at said normal operating speed) to produce the repeat pattern respectively along longer or shorter lengths of the web (e.g., every 19 ½ inches or every 14 ½ inches along the web 11). Such increases or decreases of the web speed ratio with respect to the driving speed of the drive system will cause the web speed not to match the peripheral speed of the applicator wheel or the speed of the means for periodically moving a portion of the web along the transverse path portion generally edgewise as it moves that portion of the web from the first position to the second position. To afford compensation for such mismatches, the device further includes web speed compensating means for temporarily matching the speed of the web along the inlet and outlet path portions to the peripheral speed of the applicator wheel and the speed of the means for periodically moving a portion of the web along the transverse path portion generally edgewise as it moves that portion of the web from the first position to the second position.

The device can be used to apply many different types of layers of material to many types of webs including (but not limited to) the application of layers of liquid such as ink, paint or adhesive, or layers of film, paper, non-wovens, foils or tape that may be adhered by pressure sensitive, hot melt, or pressure sensitive hot melt adhesive to webs of polymeric or other materials. One particularly suitable use for the application device is for applying elastic material (especially activatable elastic), reinforcing layers, fasteners, moisture barriers, etc to a polymeric web adapted to subsequently be cut to length during the manufacture of disposable garments such as diapers or adult incontinence garments.

When layers of tape (e.g., activatable elastic) or other materials are to be applied by a hot melt pressure sensitive adhesive, the applicator wheel may be a vacuum wheel and the means for applying the layers generally transversely across the transverse path portion during movement of the portion of the web along the transverse path portion generally edgewise from the first position to the second position can further comprise means for defining a path for a supply length of the tape leading to the periphery of the vacuum wheel including two cooled rotatably mounted drums having peripheries defining portions of the path, hot melt pressure sensitive adhesive applying means along the periphery of one cooled drum for applying a strip of the adhesive on an outer surface of the supply length of tape along its periphery, with the periphery of the second cooled drum being adapted to be contacted by and to cool and guide the adhesive coating along the supply length of tape; means for advancing the adhesive coated supply length of tape along the path at a rate of speed slower than the speed of the peripheral surface of the vacuum wheel, and means for cutting a predetermined length from the supply length of adhesive coated tape along the peripheral surface of the vacuum wheel so that the cut length will be carried into engagement with the portion of the web along the transverse path portion.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
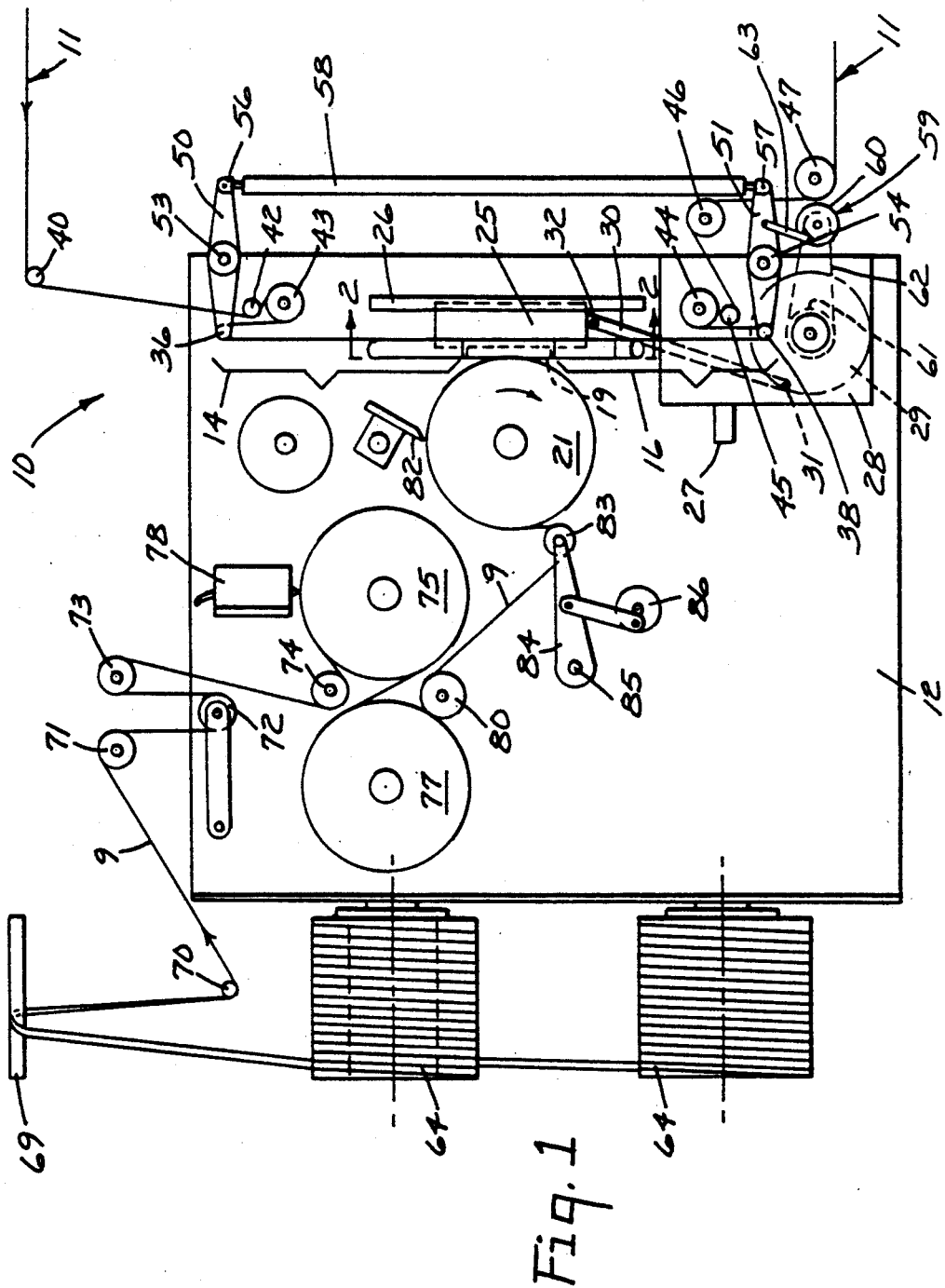
FIG. 1 is a schematic vertical side view of a device according to the present invention for applying layers of material in spaced relationship generally transversely across an elongate web continuously moved through the device.

Referring now to the drawing, there is shown an application device according to the present invention generally designated by the reference numeral 10 for applying layers of material 8 in spaced relationship generally transversely across an elongate web 11 continuously moved through the device 10 at a constant rate of speed by an external drive system (not shown). The application device 10 is particularly adapted for applying layers of heat activatable elastic material 8 (such as that described in U.S. Pat. No. 4,552,795, issued Nov. 12, 1985, the content whereof is incorporated herein by reference) to a polymeric web 11 (e.g., embossed polyethylene film 0.0023 to 0.0038 centimeter (0.0009 to 0.0015 inch) thick) adapted to subsequently be cut into lengths during the manufacture of disposable diapers.

Figure 2:
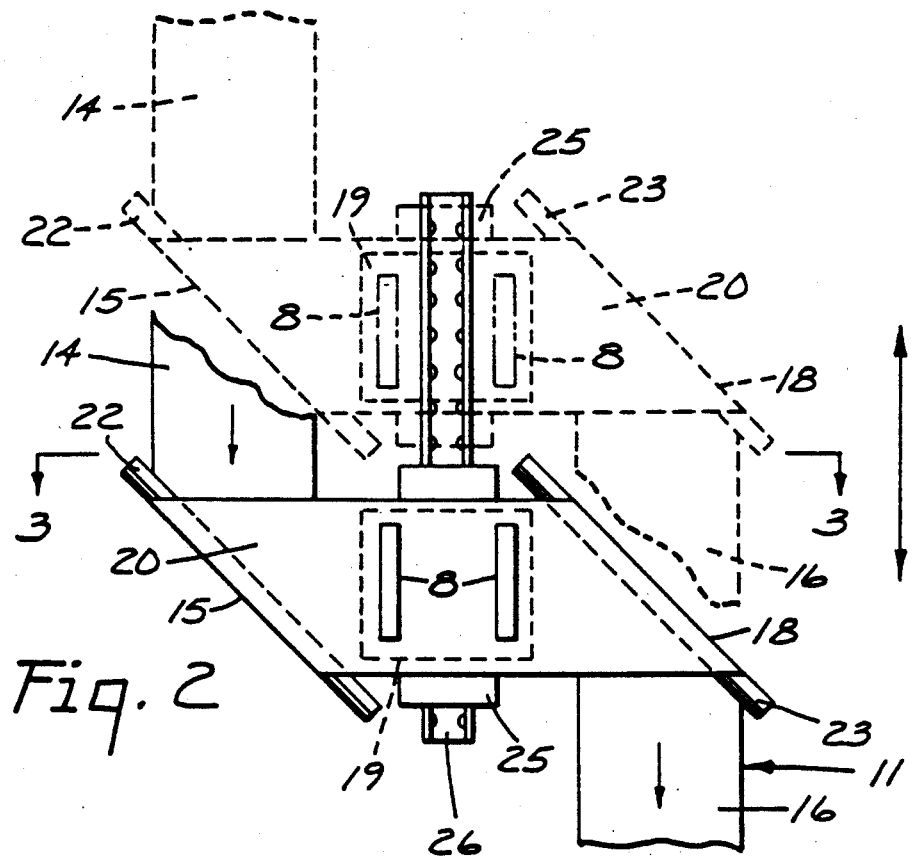
FIG. 2 is a fragmentary enlarged view taken approximately along line 2—2 of FIG. 1.
Figure 3:
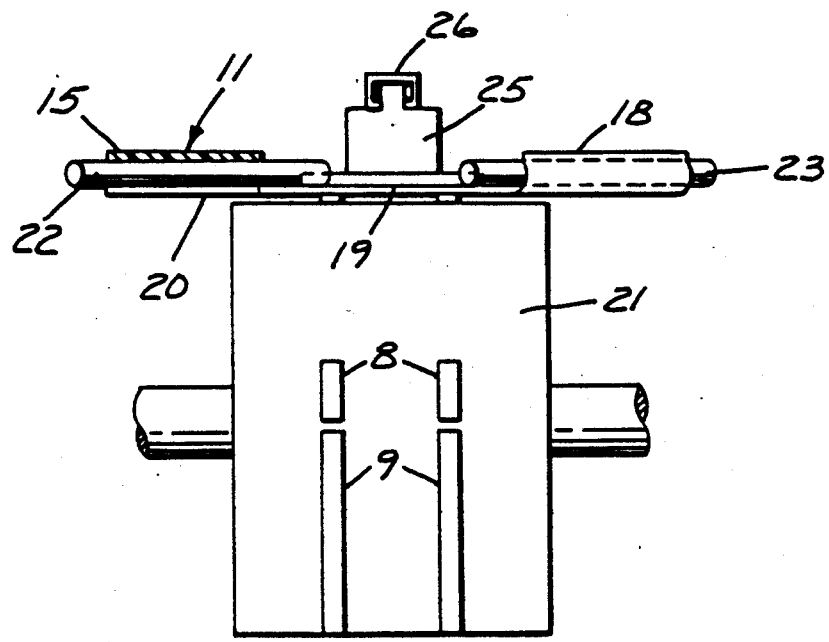
FIG. 3 is a fragmentary enlarged view taken approximately along line 3—3 of FIG. 2.

Generally the device 10 comprises a frame 12, means on the frame 12 for defining a through path for the web 11 including an inlet path portion 14 along which the edges of the web 11 define parallel planes at right angles to the surfaces of the web 11, which inlet path portion 14 terminates at a terminal end 15 (FIG. 2); an outlet path portion 16 along which the edges of the web 11 define parallel planes at right angles to the surfaces of the web 11 and spaced from the planes defined by the edges of the web 11 along the inlet path portion 14, which outlet path portion 16 begins at a beginning end 18 (FIG. 2) adjacent the terminal end 15, and a transverse path portion 20 (FIG. 2) between the terminal and beginning ends 15 and 18 of the inlet and outlet path portions 14 and 16 which as illustrated is disposed at about a right angle with respect to the inlet and outlet path portions 14 and 16, but could be disposed at other angles relative thereto if it were desired to apply the layers of material 8 at other than a right angle with respect to the edges of the web 11. The device 10 is adapted to have the web 11 move from the inlet path portion 14 through the transverse path portion 20 to the outlet path portion 16 and includes means for periodically moving a portion of the web 11 along the transverse path portion 20 generally edgewise in a direction parallel to said planes while simultaneously changing the individual lengths of the inlet and outlet path portions 14 and 16 but keeping their combined lengths the same, which movement is between a first position (shown is dotted outline in FIG. 2) at which the inlet path portion 14 has its minimum length and a second position (shown in solid outline in FIG. 2) at which the inlet path portion 14 has its maximum length; and means including a rotary vacuum applicator drum 21 is provided for applying layers of material 8 (e.g., lengths of tape) generally transversely across a portion of the web 11 along the transverse path portion 20 during movement of the portion of the web 11 along the transverse path portion 20 generally edgewise from the first position to the second position. When the web 11 is continuously moved lengthwise at a predetermined speed in a first direction along the inlet and outlet path portions 14 and 16 and the portion of the web 11 along the transverse path portion 20 is moved edgewise from the first position to the second position in the first direction at that same predetermined speed, the length of the inlet path portion 14 increases and the length of the outlet path portion 16 decreases at a rate equal to that predetermined speed so that essentially no longitudinal movement of the portion of the web 11 occurs along the transverse path portion 20, and the layers of material 8 can be applied transversely across the portion of the web 11 along the transverse path portion 20 by a periphery of the applicator drum 21 as that portion of the web 11, backed by a planar surface 19 of a platen, moves tangentially along that periphery and the drum 21 is rotated so that its periphery is also moving in the same direction at that predetermined speed.

Preferably the means for defining the terminal and beginning ends 15 and 18 of the inlet and outlet path portions 14 and 16 and the transverse path portion 20 for the web 11 comprises first and second generally parallel spaced elongate guide members 22 and 23 (see FIG. 2) which are cylindrical light weight air bars (i.e., each guide member 22 and 23 is made of light weight hollow stainless steel tubing and includes means comprising a plurality of openings through its periphery (not shown) for directing a layer of air under greater than atmospheric pressure between its periphery and the adjacent surface of the web 11 to space the portion of the web 11 extending around its periphery from its surface), which guide members 22 and 23 are disposed at acute angles (e.g., 45 degrees) with respect to the planes defined by the edges of the web 11 along the inlet and outlet path portions 14 and 16, with the first guide member 22 defining the terminal end 15 for the inlet outlet path portion 14, the second guide member 23 defining the beginning end 18 for the outlet path portion 16, and the web 11 extending about 180 degrees around the periphery of each of the guide members 22 and 23 and extending between the guide members 22 and 23 to define the transverse web path portion 20 with the surfaces along the inlet, outlet, and transverse path portions 14, 16, and 20 being parallel to each other; and the means for periodically moving a portion of the web 11 along the transverse path portion 20 generally edgewise in a direction parallel to the planes defined by the edges of the web 11 along the inlet and outlet path portions 14 and 16 between first and second positions comprises means (including a cart 25 on which the guide members 22 and 23 are mounted that is movable along a linear roller guided track 26 on the frame 12) for reciprocating the guide members 22 and 23 along a path parallel to the planes defined by the edges of the web portions along the inlet and outlet path portions 14 and 16. The use of air bars for the guide members 22 and 23 greatly reduces friction between the guide members 22 and 23 and the web 11 and thereby facilitates the rapid acceleration, deceleration and high rate of movement of the web round the guide members 22 that occurs during portions of the reciprocation of the guide members 22 and 23, for at the end of the movement of the guide members 22 and 23 to move the portion of the web 11 along the transverse path portion 20 generally edgewise to the second position (shown in dotted outline in FIG. 2) the web 11 will begin to move lengthwise at the predetermined speed around the guide members 22 and 23 and along the transverse path portion 20, as the guide members 22 and 23 return to move the portion of the web 11 along the transverse path portion 20 generally edgewise from its second to its first position the web 11 will move lengthwise around the guide members 22 and 23 and along the transverse path portion 20 at about twice the predetermined speed, and at the end of that movement in the first position (shown in solid outline in FIG. 2) the web 11 will again move lengthwise at the predetermined speed around the guide members 22 and 23 and along the transverse path portion 20.

In addition to the cart 25 on which the guide members 22 and 23 are mounted that is movable along the linear track 26 on the frame 12, the means for reciprocating the guide members 22 and 23 along a path parallel to the planes defined by the edges of the web portions along the inlet and outlet path portions 14 and 16 further comprises a drive mechanism 28 (see FIG. 1) driven by a shaft 27 from a drive system operating other web handling mechanisms (not illustrated) that modify the web 11 along portions of the web 11 path external to the device 10. The drive mechanism 28 rotates a drive wheel 29 coupled to the cart 25 by a connecting rod 30, which rod 30 is pivotably mounted by a pin 31 at one end on the periphery of the drive wheel 29 and is pivotably mounted by a pin 32 at its other end to the adjacent end of the cart 25. The drive mechanism 28 is of a type that can deliver a predetermined drive pattern to move the cart 25 in a predetermined precisely controlled reciprocal pattern with desired velocities and rates of acceleration and de-acceleration during different parts of the pattern, such as the drive mechanism commercially designated "Indexer" that is available from Camco, 1444 South Wolf Road, Wheeling, Illinois 60090.

The drive mechanism 28 and applicator wheel 21 are both driven by the drive system from the other web handling mechanisms (not shown) and are adapted to be driven in synchronism by that drive system to apply layers of material 8 in a repeat pattern along predetermined lengths of the web 11 (e.g., every 17 ½ inches along the web 11) when the web 11 is moving at one speed ratio with respect to the driving speed of the drive system (e.g., a web speed of about 730 feet per minute when the driving speed of the drive system is at a normal operating speed near its top driving speed). The drive system from the other web handling mechanisms is adjustable to allow the speed ratio of the web 11 with respect to the driving speed of the drive system to either be increased or decreased slightly (e.g., to a web speed of 812 ½ feet per minute or 604 feet per minute when the driving speed of the drive system is at said normal operating speed) to produce the repeat pattern respectively along longer or shorter lengths of the web 11 (e.g., every 19 ½ inches or every 14 ½ inches along the web 11). Such increases or decreases of the web speed ratio with respect to the driving speed of the drive system will cause the web speed not to match the peripheral speed of the applicator wheel 21 or the speed of the cart 25 and guide members 22 and 23 as they move a portion of the web 11 along the transverse path portion 20 generally edgewise from the first position to the second position. To compensate for this mismatch, the device 10 further includes web speed compensating means for matching the speed of the web 11 along the inlet and outlet path portions 14 and 16 to the peripheral speed of the applicator wheel 21 and the speed of the cart 25 and guide members 22 and 23 as they move the portion of the web 11 along the transverse path portion 20 generally edgewise from the first position to the second position when the web 11 is moved through the device 10 at a speed ratio with respect to the drive speed that is increased or decreased from that one speed ratio to temporarily change the rate of movement of the web along the inlet and outlet path portions 14 and 16 to match the peripheral speed of the applicator wheel 21 and the speed of the cart 25 and guide members 22 and 23 as they move a portion of the web 11 along the transverse path portion 20 generally edgewise from the first position to the second position.

That external web speed compensating means comprises inlet and outlet elongate light weight guide rollers or members 36 and 38 disposed at angles of about 90 degrees with respect to the edges of the web 11 portions along the inlet and outlet path portions 14 and 16. The inlet guide member 36 defines the end of the inlet path portion 14 opposite the first guide member 22 and the outlet guide member 38 defines the end of the outlet path portion 16 opposite the second guide member 25. Means in the form of two sets of guide rollers 40, 42, and 43; and 44, 45, 46, and 47 rotatably mounted on the frame 12 are provided for guiding the web 11 about 180 degrees around the peripheries of the inlet and outlet guide members 36 and 38 respectively Mounting means in the form of pivot arms 50 and 51 each supporting one of the inlet and outlet guide members 36 and 38 at one of its ends, pivotably mounted at its center about a pin 53 or 54 on the frame 12, and having its end 56 or 57 opposite the guide member 36 or 38 pivotably coupled to a tie bar 58 between the ends 56 and 57 is provided for mounting the inlet and outlet elongate guide members 36 and 38 for movement to change the individual lengths of the inlet and outlet path portion 14 and 16 while maintaining the total length of the inlet and outlet path portions 14 and 16; and means in the form of a pitman assembly 59 including a wheel 60 driven in synchronism by the drive mechanism 28 through a drive sprocket 61 and chain 62 and coupled by a connecting rod 63 pivotably attached at its ends to the periphery of the driven wheel 60 and to the pivot arm 51 is provided for moving the mounting means and thereby the inlet and outlet guide members 36 and 38 in the desired pattern to add to or subtract from the longitudinal speed of the web 11 being fed through the device 10 along the path portions 14 and 15 to match it to the predetermined speed while the guide members 22 and 23 are being moved from the first position to the second position at the predetermined speed. The point of connection between the connecting rod 63 and the driven wheel 60 is changed 180 degrees to cause the pitman assembly 59 to alternately add to or subtract from the longitudinal speed of the web 11. The connecting rod 63 of the pitman assembly 59 is disconnected from the pivot arm 51 and the pivot arm 51 is fixed to the frame 12 to prevent its movement when the external web compensating means is not in use. Instead of being rollers, the guide members 36 and 38 could alternatively be air bars which would further reduce friction between the guide members 36 and 38 and the web 11 and thereby facilitate the acceleration, deceleration and high rate of movement of the web 180 degrees round the guide members 36 and 38 that occurs during the reciprocation of the guide members 36 and 38 to add to or subtract from the longitudinal speed of the web 11 being fed through the device 10 along the path portions 14 and 15.

As is best seen in FIG. 1, the means for applying a layer of material 8 generally transversely across the transverse path portion 20 during movement of the portion of the web 11 along the transverse path portion 20 generally edgewise from the first position to the second position comprises the applicator wheel or drum 21 which has the generally cylindrical periphery and is rotatable about an axis at right angles to the planes defined by the edges of the web portions along the inlet and outlet path portions 14 and 16; and the platen fixed on the cart 25 and having the planar support surface 19 along the surface of the web 11 along the transverse path portion 20 and opposite the applicator drum 21. The drum 21 and support surface 19 are sized and positioned so that the support surface 19 will move along a path tangential to the cylindrical periphery of the applicator drum 21 during movement of the cart 25 from the first position to the second position; and the drive means for the drum 21 (not shown) rotates it to move its cylindrical periphery generally in synchronism with and in the same direction as the support surface 19 during movement of the means for reciprocating the guide members 22 and 23 to afford application of the layers of material 8 by the applicator drum 21 transversely across the portion of the web 11 between the support surface 19 and the applicator drum 21.

As illustrated, the device 10 is adapted to apply layers of material 8 in the form of lengths of tape, the applicator drum 21 is a vacuum drum, and the means for applying the layers of material 8 generally transversely across the transverse path portion 20 during movement of the portion of the web 11 along the transverse path portion 20 generally edgewise from the first position to the second position further comprises means for defining a path for supply lengths 9 of the tape leading from two level wound supply rolls 64 of the tape to the periphery of the vacuum drum 21. These means for defining a path comprise a series of idler guide rollers 69, 70, 71, 72, 73, and 74 leading to a first internally cooled drum 75 rotatably mounted on the frame 12 and having a periphery about 290 degrees of which defines a portion of the path and which is adapted to be contacted by and to guide a second surface of the supply lengths 9 of tape, and a second internally cooled drum 77 rotatably mounted on the frame 12 and having a periphery about 300 degrees of which defines a portion of the path between the first cooled drum 75 and the vacuum drum 21. The device 10 includes a pressure sensitive hot melt adhesive applying means or electrically heated applicator 78 on the frame 12 along the periphery of the first cooled drum 75 for applying strips of pressure sensitive melt adhesive to the first surfaces of the supply lengths 9 of tape carried along the path by the periphery of the first cooled drum 75, and the periphery of the second cooled drum 77 is adapted to be contacted by and to cool and guide the adhesive coating along the first surfaces of the supply lengths 9 of tape. Means in the form of a driven roller 80 nipped against the periphery of the second cooled drum 75 is provided for advancing the supply lengths 9 of tape along the path at a rate of speed slower than the speed that the peripheral surface of the vacuum applicator drum 21 is driven, and means including a rotary knife 82 that progressively transversely cuts through the supply lengths 9 of tape as a roller 83 at the end of an arm 84 pivotably mounted on the frame 12 at a pin 85 and driven by a pitman assembly 86 is in a portion of its cycle that allows the supply lengths 9 of tape to move for the duration of the cutting in synchronism with the periphery of the drum 21 are provided for cutting predetermined lengths (the layers of material 8) from the supply lengths 9 of tape along the peripheral surface of the vacuum drum 21 so that the cut lengths of pressure sensitive hot melt adhesive coated tape 8 will be carried into engagement with the portion of the web 11 along the transverse path portion 20.

The present invention has now been described with reference to one embodiment thereof. It will be apparent to those skilled in the art that many changes can be made in the embodiment described or the uses to which it may be put without departing from the scope of the present invention. Thus the scope of the present invention should not be limited to the structures described in this application, but only by structures described by the language of the claims and the equivalents of those structures.

We claim:

1. An application device for applying layers of material in spaced relationship generally transversely across an elongate longitudinally moving web having first and second parallel edges and opposite major surfaces, said device comprising:

a frame;

means on said frame for defining a through path for the web including means for defining an inlet path portion along which inlet path portion the edges of the web move generally in imaginary parallel planes disposed at right angles to the surfaces of the web, which inlet path portion terminates at a terminal end, an outlet path portion along which outlet path portion the edges of the web move generally in imaginary parallel planes parallel to and spaced from said planes in which generally move the edges of the web along the inlet path portion, said spacing being in a direction normal to the edges of the web along the inlet path portion, which outlet path portion begins at a beginning end adjacent said terminal end, and a transverse path portion between said terminal and beginning ends of the inlet and outlet path portions;

means on said frame for periodically moving said means for defining the transverse path portion so that a portion of the web along the transverse path portion moves generally edgewise in a direction parallel to said planes while the individual lengths of the inlet and outlet path portions are simultaneously changed, which movement of said means for defining the transverse path portion is between a first position at which the inlet path portion has its minimum length and a second position at which the inlet path portion has its maximum length; and means on said frame for applying a layer of material generally transversely across a portion of the web along the transverse path portion during movement of said means for defining the transverse path portion from said first position to said second position;

so that when the web is moved lengthwise at a predetermined speed in a first direction along said inlet and outlet path portions and said means for defining the transverse path portion is moved from said first position to said second position at said predetermined speed the longitudinal movement of the portion of the web along the transverse path portion is essentially stopped, and the layer of material can be applied transversely across the portion of the web along the transverse path portion by said means for applying.

2. An application device according to claim 1 wherein said means for defining disposes said transverse path portion at about a right angle with respect to said inlet and outlet path portions.

3. An application device according to claim 1 wherein:

said means for defining a through path for the web comprises first and second generally parallel elongate guide members disposed at acute angles with respect to the edges of the web along said inlet and outlet path portions and defining said transverse web path portion between said guide members, said first guide member defining said terminal end for said inlet path portion and said second guide member defining said beginning end for said outlet path portion, and said web extending about 180 degrees around the periphery of each of said guide members; and said means for periodically moving a portion of the web along the transverse path portion generally edgewise in a direction parallel to said planes between first and second positions comprises means for reciprocating said guide members along a path parallel to said planes.

4. An application device according to claim 1 wherein:

said means for defining a through path for the web comprises spaced generally parallel elongate first and second guide members disposed at angles of about 45 degrees with respect to the edges of the web along said inlet and outlet path portions and defining said transverse web path portion between said guide members, said first guide member defining said terminal end for said inlet path portion and said second guide member defining said beginning end for said outlet path portion, and said web extends about 180 degrees around the periphery of each of said guide members; and said means for periodically moving a portion of the web along the transverse path portion generally edgewise in a direction parallel to said planes between first and second positions comprises means for reciprocating said guide members along a path parallel to said planes.

5. An application device according to claim 4 wherein said guide members each include means for directing a layer of air under greater than atmospheric pressure between the guide member and the adjacent surface of the web to space the portion of the web extending around the periphery of the guide member from the guide member.

6. An application device according to claim 4 wherein said device further includes means for temporarily changing the rate of movement of the web along said inlet and outlet path portions during operation of said means for periodically moving a portion of the web along the transverse path portion generally edgewise from said first position to said second position.

7. An application device according to claim 6 wherein said means for temporarily changing the rate of movement of the web along said inlet and outlet path portions during operation of said means for periodically moving a portion of the web along the transverse path portion generally edgewise from said first position to said second position comprises:

inlet and outlet elongate guide members disposed at angles of about 90 degrees with respect to the edges of the web along said inlet and outlet path portions, said inlet guide member defining the end of said inlet path portion opposite said first guide member and said outlet guide member defining the end of said outlet path portion opposite said second guide member;

means for guiding said web about 180 degrees around the periphery of each of said inlet and outlet guide members;

mounting means for mounting said inlet and outlet elongate guide members for movement to change the individual lengths of said inlet and outlet path portions while maintaining the total length of said inlet and outlet path portions; and cam means for moving said mounting means.

8. An application device according to claim 7 wherein said inlet and outlet guide members each include means for directing a layer of air under greater than atmospheric pressure between the guide member and the adjacent surface of the web to space the portion of the web extending around the periphery of the guide member from the guide member.

9. An application device according to claim 4 wherein said means for applying a layer of material generally transversely across the transverse path portion during movement of the portion of the web along the transverse path portion generally edgewise from said first position to said second position comprises:

an applicator wheel having a generally cylindrical periphery and having an axis at right angles to said planes, said wheel being rotatably mounted on said frame for rotation about said axis: and a platen having a planar support surface supporting one surface of the web along said transverse path portion and being carried by said means for reciprocating said guide members, said wheel and support surface being sized and positioned so that said support surface will move along a path tangential to the cylindrical periphery of said applicator wheel during movement of said means for reciprocating said guide members from said first position to said second position; and means for moving said cylindrical periphery of said applicator wheel generally in synchronism with said support surface during movement of said means for reciprocating said guide members to afford application of the layer of material by said applicator wheel transversely across the portion of the web between said support surface and said applicator wheel.

10. An application device according to claim 9 wherein the layers of material applied by said device are lengths of tape having first and second surfaces;

said applicator wheel is a vacuum wheel;

said means for applying the layer of material generally transversely across the transverse path portion during movement of the portion of the web along the transverse path portion generally edgewise from said first position to said second position further comprises:

means for defining a path for a supply length of tape leading to the periphery of said vacuum wheel comprising a first cooled drum rotatably mounted on said frame and having a periphery defining a portion of the path and adapted to be contacted by and to guide the second surface of the supply length of tape, and a second cooled drum rotatably mounted on said frame and having a periphery defining a portion of the path between said first cooled drum and said vacuum wheel, said device including pressure sensitive hot melt adhesive applying means on said frame along the periphery of said first cooled drum for applying a strip of melted pressure sensitive hot melt adhesive to the first surface of the supply length of tape carried along the path by the periphery of said first cooled drum, the periphery of said second cooled drum being adapted to be contacted by and to cool and guide the pressure sensitive hot melt adhesive coating along the first surface of the supply length of tape;

means for advancing the supply length of tape along the path at a rate of speed slower than the speed of the peripheral surface of said vacuum wheel, and means for cutting a predetermined length from the supply length of tape along the peripheral surface of the vacuum wheel so that the cut length of adhesive coated tape will be carried into engagement with the portion of the web along the transverse path portion.

11. In combination, an elongate web of polymeric material having first and second parallel edges and opposite major surfaces and adapted to be incorporated in a disposable garment such as a diaper, layers of elastic material, and an application device for applying the layers of material in spaced relationship generally transversely across the web, and means for constantly moving said web through said device, said device comprising:

a frame;

means on said frame for defining a through path for the web including means for defining an inlet path portion along which inlet path portion the edges of the web move generally in imaginary parallel planes disposed at right angles to the surfaces of the web, which inlet path portion terminates at a terminal end, an outlet path portion along which outlet path portion the edges of the web move generally in imaginary parallel planes parallel to and spaced from said planes in which generally move the edges of the web along the inlet path portion, said spacing being in a direction normal to the edges of the web along the inlet path portion, which outlet path portion begins at a beginning end adjacent said terminal end, and a transverse path portion between said terminal and beginning ends of the inlet and outlet path portions;

means on said frame for periodically moving said means for defining the transverse path portion so that a portion of the web along the transverse path portion moves generally edgewise in a direction parallel to said planes while the individual lengths of the inlet and outlet path portions are simultaneously changed, which movement of said means for defining the transverse path portion is between a first position at which the inlet path portion has its minimum length and a second position at which the inlet path portion has its maximum length; and means on said frame for applying the layers of material generally transversely across a portion of the web along the transverse path portion during movement of said means for defining the transverse path portion from said first position to said second position;

said web being moved lengthwise at a predetermined speed in a first direction along said inlet and outlet path portions and said means for defining the transverse path portion being moved from said first position to said second position at said predetermined speed so that the longitudinal movement of the portion of the web along the transverse path portion is essentially stopped, and the layers of material are applied transversely across the portion of the web along the transverse path portion by said means for applying.

12. A combination according to claim 11 wherein said means for defining disposes said transverse path portion at about a right angle with respect to said inlet and outlet path portions.

13. A combination according to claim 11 wherein:
said means for defining a through path for the web comprises first and second generally parallel elongate guide members disposed at acute angles with respect to the edges of the web along said inlet and outlet path portions and defining said transverse web path portion between said guide members, said first guide member defining said terminal end for said inlet outlet path portion and said second guide member defining said beginning end for said outlet path portion, and said web extending about 180 degrees around the periphery of each of said guide members; and
said means for periodically moving a portion of the web along the transverse path portion generally edgewise in a direction parallel to said planes between first and second positions comprises means for reciprocating said guide members along a path parallel to said planes.

14. A combination according to claim 11 wherein:
said means for defining a through path for the web comprises spaced generally parallel elongate first and second guide members disposed at angles of about 45 degrees with respect to the edges of the web along said inlet and outlet path portions and defining said transverse web path portion between said guide members, said first guide member defining said terminal end for said inlet path portion and said second guide member defining said beginning end for said outlet path portion, and said web extends about 180 degrees around the periphery of each of said guide members; and
said means for periodically moving a portion of the web along the transverse path portion generally edgewise in a direction parallel to said planes between first and second positions comprises means for reciprocating said guide members along a path parallel to said planes.

15. A combination according to claim 14 wherein said guide members each include means for directing a layer of air under greater than atmospheric pressure between the guide member and the adjacent surface of the web to space the portion of the web extending around the periphery of the guide member from the guide member.

16. A combination according to claim 14 wherein said device further includes means for temporarily changing the rate of movement of the web along said inlet and outlet path portions during operation of said means for periodically moving a portion of the web along the transverse path portion generally edgewise from said first position to said second position.

17. A combination according to claim 16 wherein said means for temporarily changing the rate of movement of the web along said inlet and outlet path portions during operation of said means for periodically moving a portion of the web along the transverse path portion generally edgewise from said first position to said second position comprises:
inlet and outlet elongate guide members disposed at angles of about 90 degrees with respect to the edges of the web along said inlet and outlet path portions, said inlet guide member defining the end of said inlet path portion opposite said first guide member and said outlet guide member defining the end of said outlet path portion opposite said second guide member;
means for guiding said web about 180 degrees around the periphery of each of said inlet and outlet guide members;
mounting means for mounting said inlet and outlet elongate guide members for movement to change the individual lengths of said inlet and outlet path portions while maintaining the total length of said inlet and outlet path portions; and
cam means for moving said mounting means.

18. A combination according to claim 17 wherein said inlet and outlet guide members each include means for directing a layer of air under greater than atmospheric pressure between the guide member and the adjacent surface of the web to space the portion of the web extending around the periphery of the guide member from the guide member.

19. An application device according to claim 14 wherein said means for applying a layer of material generally transversely across the transverse path portion during movement of the portion of the web along the transverse path portion generally edgewise from said first position to said second position comprises:
an applicator wheel having a generally cylindrical periphery and having an axis at right angles to said planes, said wheel being rotatably mounted on said frame for rotation about said axis: and
a platen having a planar support surface supporting one surface of the web along said transverse path portion and being carried by said means for reciprocating said guide members, said wheel and support surface being sized and positioned so that said support surface will move along a path tangential to the cylindrical periphery of said applicator wheel during movement of said means for reciprocating said guide members from said first position to said second position; and
means for moving said cylindrical periphery of said applicator wheel generally in synchronism with said support surface during movement of said means for reciprocating said guide members to afford application of the layer of material by said applicator wheel transversely across the portion of the web between said support surface and said applicator wheel.

20. An application device according to claim 19 wherein the layers of elastic material applied by said device have first and second surfaces;
said applicator wheel is a vacuum wheel;
said means for applying the layer of material generally transversely across the transverse path portion during movement of the portion of the web along the transverse path portion generally edgewise from said first position to said second position further comprises:
means for defining a path for a supply length of elastic material leading to the periphery of said vacuum wheel comprising a first cooled drum rotatably mounted on said frame and having a periphery defining a portion of the path and adapted to be contacted by and to guide the second surface of the supply length of elastic material, and a second cooled drum rotatably mounted on said frame and having a periphery defining a portion of the path between said first cooled drum and said vacuum wheel, said device including pressure sensitive hot melt adhesive applying means on said frame along the periphery of said first cooled drum for applying a strip of melted pressure sensitive hot melt adhesive to the first surface of the supply length of elastic material carried along the path by the periphery of said first cooled drum, the periphery of said second cooled drum being adapted to be contacted by and to cool and guide the pressure sensitive hot melt adhesive coating along the first surface of the supply length of tape;

means for advancing the supply length of elastic material along the path at a rate of speed slower than the speed of the peripheral surface of said vacuum wheel, and means for cutting a predetermined length from the supply length of elastic material along the peripheral surface of the vacuum wheel so that the cut length of adhesive coated elastic material will be carried into engagement with the portion of the web along the transverse path portion.

21. A method for applying layers of material in spaced relationship generally transversely across one surface of an elongate web having first and second parallel edges, the method comprising the steps of:

defining a through path for the web including an inlet path portion terminating at a terminal end along which inlet path portion the edges of the web define parallel planes at right angles to the surfaces of the web, an outlet path portion beginning at a beginning end adjacent said terminal end along which outlet path portion the edges of the web define parallel planes at right angles to the surfaces of the web and spaced from the planes defined by the edges of the web along the inlet path portion, and a transverse path portion between said terminal and beginning ends of the inlet and outlet path portions;

moving the web lengthwise at a predetermined speed in a first direction along said inlet and outlet path portions;

periodically moving the portion of the web along the transverse path portion generally edgewise in a direction parallel to the first direction and at about said predetermined speed during said step of moving the web to essentially stop longitudinal movement of the portion of the web along the transverse path portion; and applying a layer of material generally transversely across the portion of the web along the transverse path portion during said periodically moving step.

22. A method according to claim 21 wherein the layer of material is an elastic, and the web is of polymeric material to be incorporated in a disposable garment such as a diaper.

23. A method according to claim 21 wherein the layer of material is an activatable elastic, and the web is of polymeric material to be incorporated in a disposable garment such as a diaper.

* * * * *